US009656869B2

(12) United States Patent
Hoppe et al.

(10) Patent No.: US 9,656,869 B2
(45) Date of Patent: May 23, 2017

(54) PROCESS FOR THE PREPARATION OF TRISILYLAMINE FROM MONOCHLOROSILANE AND AMMONIA

(75) Inventors: Carl-Friedrich Hoppe, Gruendau (DE); Hartwig Rauleder, Rheinfelden (DE); Ingrid Lunt-Rieg, Bad Homburg (DE); Christian Goetz, Seligenstadt (DE)

(73) Assignee: Evonik Degussa GmbH, Essen (DE)

(*) Notice: Subject to any disclaimer, the term of this patent is extended or adjusted under 35 U.S.C. 154(b) by 0 days.

(21) Appl. No.: 14/131,126

(22) PCT Filed: May 15, 2012

(86) PCT No.: PCT/EP2012/059019
§ 371 (c)(1),
(2), (4) Date: Jan. 6, 2014

(87) PCT Pub. No.: WO2013/004423
PCT Pub. Date: Jan. 10, 2013

(65) Prior Publication Data
US 2014/0161705 A1    Jun. 12, 2014

(30) Foreign Application Priority Data
Jul. 6, 2011    (DE) .................. 10 2011 078 749

(51) Int. Cl.
C01B 21/087    (2006.01)
C01C 1/16      (2006.01)
C01B 33/04     (2006.01)
B01J 19/24     (2006.01)

(52) U.S. Cl.
CPC ........... C01B 21/087 (2013.01); B01J 19/24 (2013.01); C01B 33/043 (2013.01); C01C 1/164 (2013.01)

(58) Field of Classification Search
CPC .................................... C01B 21/087
USPC ......................................... 423/324
See application file for complete search history.

(56) References Cited

U.S. PATENT DOCUMENTS

2010/0080746 A1    4/2010  Lang et al.
2011/0136347 A1    6/2011  Kovarsky et al.
2013/0323151 A1   12/2013  Mueh et al.
2014/0072497 A1    3/2014  Doering et al.

FOREIGN PATENT DOCUMENTS

| JP | 03-063284 B | 9/1991 |
| JP | 2012-528785 A | 11/2012 |
| JP | 2014-522366 A | 9/2014 |
| WO | WO 2010/114141 A1 | 10/2010 |
| WO | WO 2010/141551 A1 | 12/2010 |
| WO | WO2011/049811 A2 * | 4/2011 ............ C23C 16/22 |
| WO | WO 2011/049811 A2 | 4/2011 |
| WO | WO 2012/110275 A1 | 8/2012 |
| WO | WO 2012/156191 A1 | 11/2012 |
| WO | WO 2013/087298 A1 | 6/2013 |

OTHER PUBLICATIONS

U.S. Appl. No. 14/345,587, filed Mar. 18, 2014, Hoppe, et al.
U.S. Appl. No. 14/344,801, filed Mar. 13, 2014, Hoppe, et al.
U.S. Appl. No. 14/344,793, filed Mar. 13, 2014, Hoppe, et al.
Written Opinion issued Oct. 23, 2012 in International Application No. PCT/EP2012/059019.
Alfred Stock, et al., "Siliciumwasserstoffe, X: Stickstoffhaltige Verbindungen", Ber. Dtsch. Chem. Ges., Bd. 54, 1921, pp. 740-758.
L. G. L. Ward, "Bromosilane, Iodosilane, and Trisilylamine", Inorganic Synthesis, vol. XI, 1968, pp. 159-170.
Office Action issued Mar. 23, 2015 in Japanese Patent Application No. 2014-517542 (submitting English translation only).

* cited by examiner

Primary Examiner — Matthew E Hoban
Assistant Examiner — James Fiorito
(74) Attorney, Agent, or Firm — Oblon, McClelland, Maier & Neustadt, L.L.P.

(57) ABSTRACT

The present invention relates to a specific process for producing trisilylamine from monochlorosilane and ammonia in the liquid phase. The invention further relates to a plant in which such a process can be carried out with advantage.

7 Claims, 1 Drawing Sheet

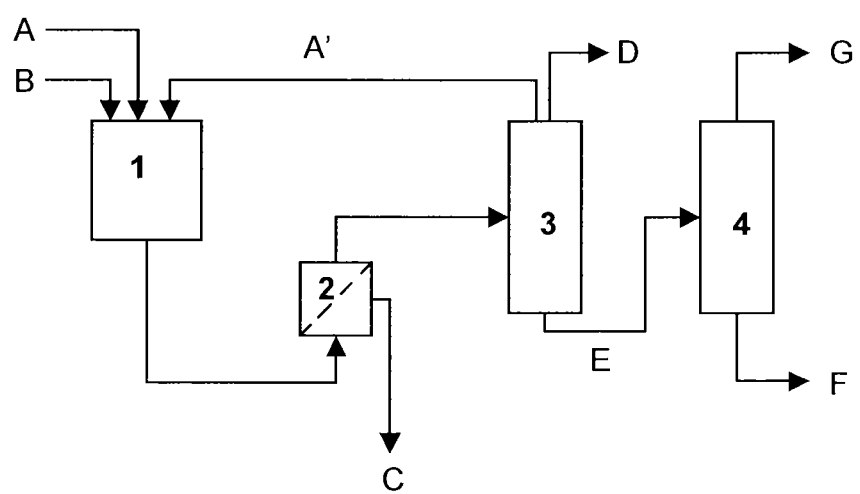

PROCESS FOR THE PREPARATION OF TRISILYLAMINE FROM MONOCHLOROSILANE AND AMMONIA

The present invention relates to a process for producing trisilylamine from monochlorosilane and ammonia in the liquid phase. The present invention further relates to a plant wherein such a process can be carried out.

Trisilylamine (TSA), $N(SiH_3)_3$, is an extremely mobile, colourless, self-ignitable and readily hydrolysable liquid having a melting point of $-105.6°$ C. and a boiling point of $+52°$ C. Nitrogen-containing silicon compounds such as trisilylamine are important substances in the semiconductor industry.

It has long been known to use TSA to produce silicon nitride layers (U.S. Pat. No. 4,200,666, JP 1986-96741). TSA more particularly finds application in chip manufacture as a layer precursor for silicon nitride or silicon oxynitride layers. EP 1 547 138 for example discloses a very specific process for using TSA. Owing to its use in chip manufacture, it is important to be able to produce trisilylamine in the required, generally ultrapure quality in a safe, reliable and consistent manner.

Trisilylamine is synthesizable from monochlorosilane and ammonia as per the following equation:

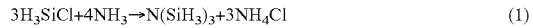

$$3H_3SiCl + 4NH_3 \rightarrow N(SiH_3)_3 + 3NH_4Cl \quad (1)$$

Ammonium chloride is by-produced. The reaction of monochlorosilane and ammonia is a spontaneous, exothermic reaction.

Alfred Stock and Karl Somieski in Ber. Dtsch. Chem. Ges. 54, 740 ff., 1921, report the immediate reaction of monochlorosilane gas and ammonia gas at room temperature in accordance with equation (1). The reaction proceeds with excess monochlorosilane to produce quantitative trisilylamine. By-produced ammonium chloride separates out.

WO 2010/141551 describes the reaction of monochlorosilane with ammonia in the gas phase.

WO 2011/049811 teaches producing silylamines as closely as possible to the site of use in order to minimize the delivery distance and hence the delivery time.

According to WO 2011/049811, TSA-containing silylamines are obtainable from monochlorosilane and ammonia both in the gas phase and in the liquid phase.

Richard L. Wells and Riley Schaeffer in J. Am. Chem. Soc. 88, 37 ff., 1966, already describe reacting monochlorosilane with ammonia by warming a mixture of the two compounds from $-196°$ C. to room temperature. In addition to trisilylamine formation as per equation (1), a sequence of descendent reactions is observed:

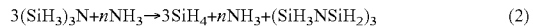

$$3(SiH_3)_3N + nNH_3 \rightarrow 3SiH_4 + nNH_3 + (SiH_3NSiH_2)_3 \quad (2)$$

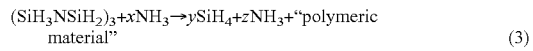

$$(SiH_3NSiH_2)_3 + xNH_3 \rightarrow ySiH_4 + zNH_3 + \text{"polymeric material"} \quad (3)$$

Thus, trisilylamine can react further in the presence of ammonia to form monosilane ($SiH_4$) and N,N',N''-trisilylcyclotrisilazane ($SiH_3NSiH_2)_3$ and also "polymeric material". Descendent reactions (2) and (3) have a disadvantageous effect on the yield of trisilylamine.

The problem addressed by the present invention was therefore that of providing a technical and very economical solution for liquid-phase production of trisilylamine from ammonia and monochlorosilane whereby product streams are interconnected within a multi-stage plant such that the conversion of the reactant feeds into the trisilylamine end product is very efficient.

This problem is solved according to the present invention by the features in the claims. What follows is accordingly a description of a process according to the present invention and of a plant according to the present invention, in which such a process can be carried out with advantage, including preferred embodiments.

It was surprisingly found that advantageously monochlorosilane (A and A') is initially charged to a reactor (1) in liquid form and ammonia (B) is passed into the initial charge and a product mixture containing TSA and $NH_4Cl$ which is in solid form is obtained. Subsequently, the resulting product mixture is passed from reactor (1) via a filter unit (2) wherein solid ammonium chloride (C) is removed from the product mixture. Thereafter, the filtrate is fed into the distillation column (3) in which excess monochlorosilane (A') is distilled overhead, condensed and advantageously fed back into reactor (1) in liquid form. It is further possible to remove monosilane (D) from the distillation column (3) overhead. The bottoms (E) of column (3) are conveyed into distillation column (4) where the product trisilylamine (G) is distilled overhead and condensed. Higher boilers are removed from the system via the bottoms (F).

The process described above can be carried out not only batchwise but also continuously and thus provides an advantageous way of producing very pure TSA.

The FIGURE illustrates a preferred embodiment of a processing scheme for the process of the present invention, and also a plant according to the present invention.

The present invention accordingly provides a process for production of trisilylamine in the liquid phase, which process comprises
initially charging monochlorosilane (A or A') to a reactor (1) in liquid form and
passing ammonia (B) into the reactor (1),
performing the reaction in reactor (1),
subsequently passing the resulting product mixture from reactor (1) into and through a filter unit (2) and removing solid ammonium chloride (C) from the product mixture and
passing the filtrate from the filter unit (2) into the distillation column (3),
excess monochlorosilane (A') being distilled in distillation column (3) overhead, condensed and fed to reactor (1) in liquid form, and also
removing gaseous substances (D) from the distillation column (3) overhead and
conveying the bottoms (E) into the distillation column (4), the product trisilylamine (G) being distilled in the distillation column (4) overhead and condensed and
removing higher boilers from the system via the bottoms (F).

The reaction is preferably carried out under protective gas, for example nitrogen and/or a noble gas, and in the absence of oxygen and water (humidity, moisture), and the present plant is suitably dried and purged with protective gas before the first filling operation.

Moreover, the plant components used according to the present invention, which come into contact with substances occuring here, are advantageously made of stainless steel and are coolable/heatable in a controlled manner.

The process of the present invention preferably utilizes component (A or A') in a molar excess relative to component (B), and the reactor (1) is suitably filled with the reaction mixture of components (A) and (B) and of (A') recycled from the distillation column (3) up to 99%, preferably from 5 to 95% and more preferably from 20 to 80%, of the reactor volume to perform the reaction. Advantageously, the monochlorosilane is initially charged for this in liquid form and ammonia is passed in. Ammonia can be added in gaseous and/or liquid form. It is further advantageous to add to the ammonia stream a gaseous, preferably inert diluent, such as nitrogen.

It is further advantageous for the reactor contents to be mixed in the practice of the process according to the present invention, especially in the course of the reactor being filled and also in the course of reacting the components. The reaction or product mixture in reactor (1) can be stirred for instance.

The reaction in reactor (1) is carried out according to the present invention at a temperature of −60 to +40° C., preferably at −15 to +15° C., more preferably −10 to +10° C. and even more preferably −5 to +5° C.

Furthermore, owing to the initial charging of liquid monochlorosilane and addition of ammonia, the reaction in the reactor establishes essentially the vapour/liquid equilibrium pressure of a corresponding mixture of monochlorosilane, ammonia and the resultant TSA and also any proportionate by-products.

The present invention further provides a plant in which the process of the present invention can be carried out, the plant comprising a reactor (1) with respective inlets for the reactants and components (A), (A') and (B) and a product mixture outlet leading into a filter unit (2) downstream of reactor (1), this filter unit (2) being equipped with a solids outlet for component (C) and with a line for conveying the filtrate from the unit (2) into a subsequent distillation unit which consists of at least two distillation columns (3) and (4) and the distillation column (3) is equipped with an outlet overhead for a gaseous stream (D) and with an outlet overhead with return line for condensed monochlorosilane (A') into the reactor (1) and also with a line for transferring bottoms (E) from the distillation column (3) into the subsequent distillation column (4) to recover trisilylamine (G) and remove bottoms (F) from the system.

The process of the present invention is generally carried out in a plant according to the present invention by liquid monochlorosilane (A or A') and ammonia (B) being passed into a reactor (1) and suitably mixed to form a product mixture containing TSA and solid $NH_4Cl$. The product mixture is subsequently passed via a filter unit (2) in which solid ammonium chloride (C) is removed. The filtrate from filter unit (2) is passed to a distillation column (3) in which excess monochlorosilane (A') is distilled overhead, condensed and fed back to reactor (1) in liquid form, i.e. advantageously is recycled. Furthermore, monosilane (D) can be withdrawn from distillation column (3) overhead. The bottoms (E), which generally contains TSA and also higher boilers, is conveyed into the column (4) in which very pure trisilylamine (G) can be distilled overhead, condensed and withdrawn. Higher boilers (F) can be removed from the system via the bottoms of column (4).

The present invention thus provides a simple and economical way to produce trisilylamine in industrial quantities and very good quality.

LIST OF REFERENCE NUMERALS (1) reactor
(2) filter unit
(3) distillation column
(4) distillation column
(A) monochlorosilane
(A') recycled monochlorosilane
(B) ammonia
(C) ammonium chloride
(D) gaseous substances overhead from (3), inter alia monosilane
(E) transfer of bottoms from (3) to (4)
(G) trisilylamine
(F) bottoms from (4)

The invention claimed is:

1. A process for production of trisilylamine, comprising:
charging monochlorosilane as a liquid to a reactor;
passing ammonia into the liquid monochlorosilane in the reactor;
reacting the ammonia and the monochlorosilane in a liquid phase in the reactor to obtain a reaction mixture comprising liquid monochlorosilane, liquid trisilylamine and solid ammonium chloride;
transferring the reaction mixture from the reactor into and through a filter unit;
collecting the solid ammonium chloride on the filter unit to obtain a filtrate of the liquid reaction mixture comprising monochlorosilane and trisilylamine;
passing the filtrate from the filter unit into a first distillation column;
distilling the monochlorosilane in the distillation column overhead, condensing the monochlorosilane and feeding the condensed monochlorosilane to the reactor; and
removing gaseous substances from the first distillation column overhead to obtain a first distillation bottoms comprising trisilylamine;
conveying the first bottoms into a second distillation column;
distilling the trisilylamine from the first bottoms in the second distillation column overhead and condensing the distillate to obtain a condensate consisting of trisilylamine; and
removing higher boilers from the system via second bottoms remaining in the second column;
wherein the process is a continuous method.

2. The process according to claim 1, wherein the monochlorosilane is in a molar excess relative to the ammonia.

3. The process according to claim 1, wherein the reactor is filled with the reaction mixture of the monochlorosilane and the ammonia up to 99% of a reactor volume to perform the reaction.

4. The process according to claim 1, wherein the reaction in the reactor is carried out at temperature of from −60 to +40 ° C.

5. The process for production of trisilyla mine of claim 1, further comprising purging the reactor, filter unit and distillation columns with a protective gas and carrying out the process under a protective gas.

6. The process of claim 5, wherein the protective gas is nitrogen or a noble gas.

7. The process for production of trisilylamine of claim 1 wherein the reaction of the monochlorosilane and ammonia is conducted in the absence of oxygen and moisture.

* * * * *